(12) United States Patent
McNeil et al.

(10) Patent No.: US 8,925,384 B2
(45) Date of Patent: Jan. 6, 2015

(54) MEMS SENSOR WITH STRESS ISOLATION AND METHOD OF FABRICATION

(75) Inventors: Andrew C. McNeil, Chandler, AZ (US); Gary G. Li, Chandler, AZ (US); Lisa Z. Zhang, Chandler, AZ (US); Yizhen Lin, Niskayuna, NY (US)

(73) Assignee: Freescale Semiconductor, Inc., Austin, TX (US)

( * ) Notice: Subject to any disclaimer, the term of this patent is extended or adjusted under 35 U.S.C. 154(b) by 150 days.

(21) Appl. No.: 13/482,332

(22) Filed: May 29, 2012

(65) Prior Publication Data

US 2013/0319117 A1 Dec. 5, 2013

(51) Int. Cl.
*G01P 15/125* (2006.01)

(52) U.S. Cl.
USPC .................... 73/514.32; 73/504.12; 73/514.36

(58) Field of Classification Search
USPC ............................. 73/514.32, 514.36, 504.12
See application file for complete search history.

(56) References Cited

U.S. PATENT DOCUMENTS

| 5,763,783 | A * | 6/1998 | Asada ........................ 73/514.31 |
| 5,806,365 | A * | 9/1998 | Zunino et al. ............... 73/514.16 |
| 6,082,197 | A * | 7/2000 | Mizuno et al. ............. 73/514.36 |
| 6,367,786 | B1 * | 4/2002 | Gutierrez et al. ............ 267/136 |
| 6,792,804 | B2 | 9/2004 | Adams et al. |
| 7,099,063 | B2 * | 8/2006 | Greywall ...................... 359/290 |
| 7,784,344 | B2 * | 8/2010 | Pavelescu et al. ......... 73/514.32 |
| 8,138,007 | B2 | 3/2012 | Geisberger |
| 8,393,211 | B2 * | 3/2013 | Kandori et al. ............ 73/504.12 |
| 8,443,666 | B2 * | 5/2013 | Classen et al. ............. 73/504.12 |
| 2006/0169043 | A1 * | 8/2006 | McNeil ....................... 73/514.01 |
| 2009/0031809 | A1 * | 2/2009 | Lin et al. .................... 73/514.32 |
| 2010/0242603 | A1 * | 9/2010 | Miller et al. ............... 73/514.32 |
| 2011/0174074 | A1 * | 7/2011 | Li et al. ...................... 73/504.14 |
| 2012/0204642 | A1 * | 8/2012 | McNeil et al. ............. 73/514.32 |
| 2013/0047726 | A1 * | 2/2013 | Lin et al. .................... 73/504.12 |

* cited by examiner

*Primary Examiner* — Hezron E Williams
*Assistant Examiner* — Xin Zhong

(57) ABSTRACT

A MEMS sensor (20, 86) includes a support structure (26) suspended above a surface (28) of a substrate (24) and connected to the substrate (24) via spring elements (30, 32, 34). A proof mass (36) is suspended above the substrate (24) and is connected to the support structure (26) via torsional elements (38). Electrodes (42, 44), spaced apart from the proof mass (36), are connected to the support structure (26) and are suspended above the substrate (24). Suspension of the electrodes (42, 44) and proof mass (36) above the surface (28) of the substrate (24) via the support structure (26) substantially physically isolates the elements from deformation of the underlying substrate (24). Additionally, connection via the spring elements (30, 32, 34) result in the MEMS sensor (22, 86) being less susceptible to movement of the support structure (26) due to this deformation.

20 Claims, 7 Drawing Sheets

MEMS SENSOR WITH STRESS ISOLATION AND METHOD OF FABRICATION

TECHNICAL FIELD OF THE INVENTION

The present invention relates generally to microelectromechanical systems (MEMS) sensors. More specifically, the present invention relates to a MEMS sensor with stress isolation and fabrication methodology for the MEMS sensor.

BACKGROUND OF THE INVENTION

Microelectromechanical Systems (MEMS) sensors are widely used in applications such as automotive, inertial guidance systems, household appliances, protection systems for a variety of devices, and many other industrial, scientific, and engineering systems. Such MEMS sensors are used to sense a physical condition such as acceleration, pressure, or temperature, and to provide an electrical signal representative of the sensed physical condition.

Capacitive-sensing MEMS designs are highly desirable for operation in high acceleration environments and in miniaturized devices, and due to their relatively low cost. Capacitive accelerometers sense a change in electrical capacitance, with respect to acceleration, to vary the output of an energized circuit. One common form of accelerometer is a two layer capacitive transducer having a "teeter-totter" or "see saw" configuration. This commonly utilized transducer type uses a movable element or plate that rotates under z-axis acceleration above a substrate. The accelerometer structure can measure two distinct capacitances to determine differential or relative capacitance.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Many MEMS sensor device applications require high accuracy, smaller size, and low cost packaging to meet aggressive cost targets. In addition, MEMS device applications are calling for lower temperature coefficient of offset (TCO) specifications. TCO is a measure of how much thermal stresses effect the performance of a semiconductor device, such as a MEMS device. A high TCO indicates correspondingly high thermally induced stress. The fabrication and packaging of MEMS device applications often uses various materials with dissimilar coefficients of thermal expansion. As the various materials expand and contract at different rates in the presence of temperature changes, the active transducer layer of the MEMS device may experience stretching, bending, warping and other deformations due to the different dimensional changes of the different materials. Thus, significant thermal stress, i.e., an undesirably high TCO, often develops during manufacture or operation.

In addition, stresses can result from soldering the packaged MEMS device onto a printed circuit board in an end application. These package stresses can change the strain of the substrate on which the MEMS sensor is mounted causing offset shifts, or displacements. Moreover, the substrate may undergo some non-constant strain such as non-uniform stretching, bending, or warping across a surface of the substrate. Displacement of the underlying substrate can cause the sense plates and the proof mass to move which can cause changes in the sense signal, thus adversely affecting the output performance of the MEMS device.

Embodiments entail a microelectromechanical systems (MEMS) transducer, referred to herein as a MEMS sensor, in which the MEMS sensor is largely isolated from the underlying substrate. This isolation is achieved by suspending both the movable elements and the fixed sense elements above the surface of a substrate. The movable elements and the fixed sense elements are mounted to a support structure, e.g., a stress isolating frame, which is mounted to substrate anchors via spring elements. The stress isolating frame is rigid as compared to the spring elements so that the frame will move nearly as a rigid body in response to deformation of the underlying substrate. Another embodiment of the invention entails a method for fabricating the MEMS sensor using two structural layers, in which one structural layer achieves sense capability within the plane of the layer and the other structural layer suspends the fixed elements of the MEMS device so that they are not in direct contact with the underlying substrate.

Figure 1:
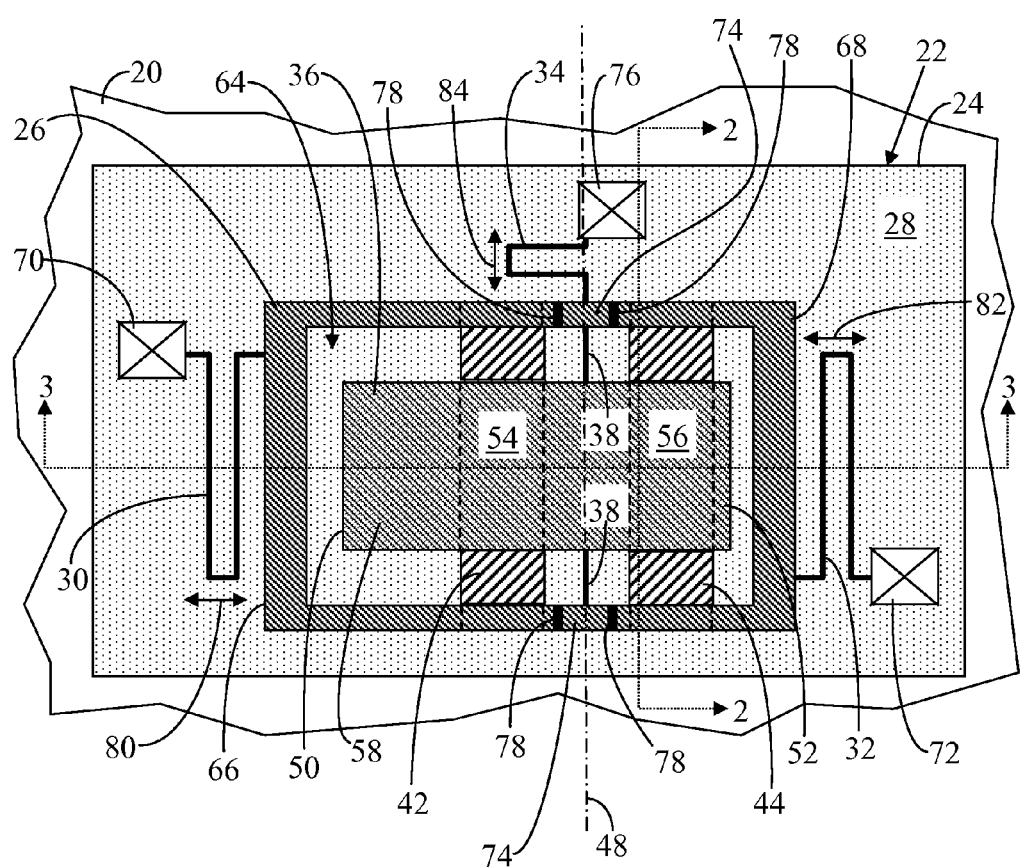
FIG. 1 shows a top view of a device that includes microelectromechanical systems (MEMS) sensor in accordance with an embodiment.
Figure 2:
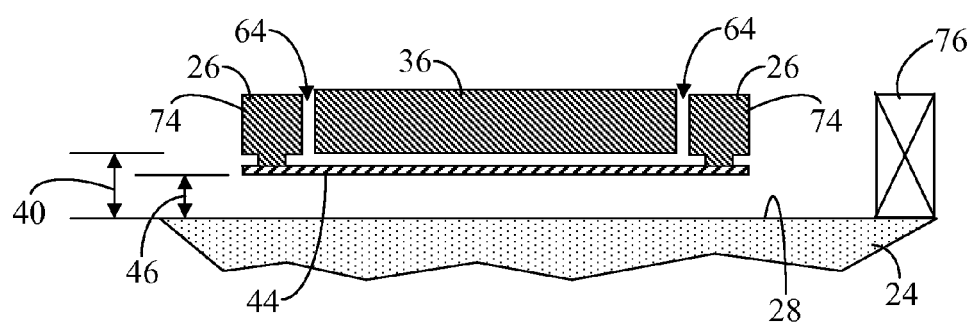
FIG. 2 shows a side view of the MEMS sensor along section line 2-2 in FIG. 1.
Figure 3:
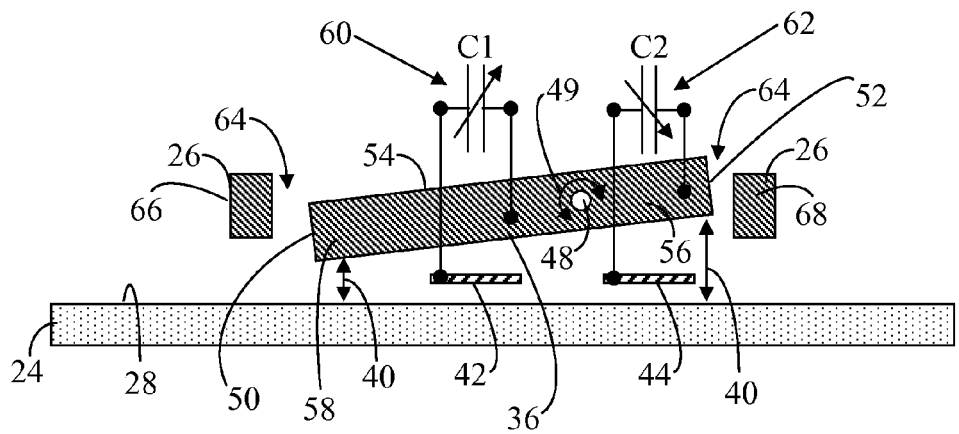
FIG. 3 shows a side view of the MEMS sensor along section line 3-3 in FIG. 1.

Referring now to FIGS. 1-3, FIG. 1 schematically shows a top view of a device 20 that includes microelectromechanical systems (MEMS) sensor 22 in accordance with an embodiment. FIG. 2 shows a side view of MEMS sensor 22 along section line 2-2 in FIG. 1, and FIG. 3 shows a side view of MEMS sensor 22 along section line 3-3 in FIG. 1. FIGS. 1-3 are illustrated using various shading and/or hatching to distinguish the different elements produced within the structural layers of MEMS sensor 22, as will be discussed below. These different elements within the structural layers may be produced utilizing current and upcoming surface micromachining techniques of depositing, patterning, etching, and so forth. Accordingly, although different shading and/or hatching may be utilized in the illustrations, the different elements within the structural layers are typically formed out of the same material, such as polysilicon, single crystal silicon, and the like.

Device 20 may be any of number of devices including, for example, automotive airbag deployment systems, inertial guidance systems, household appliances, protection systems for a variety of devices, and many other industrial, scientific, and engineering systems. Those skilled in the art will recognize that device 20 may include many other components that are not discussed herein for brevity. MEMS sensor 22 will be described herein as being an accelerometer for detecting z-axis acceleration. However, MEMS sensor 22 may be adapted to sense x- and/or y-axis acceleration, angular velocity, or MEMS sensor 22 may be another type of MEMS device.

The elements of MEMS sensor 22 (discussed below) may be described variously as being "attached to," "attached with," "coupled to," "fixed to," or "interconnected with," other elements of MEMS sensor 22. However, it should be understood that the terms refer to the direct or indirect physical connections of particular elements of MEMS sensor 22 that occur during their formation through patterning and etching processes of MEMS fabrication, as will be discussed in connection with FIG. 7.

MEMS sensor 22 includes a substrate 24 and a support structure 26 suspended above a surface 28 of substrate 24. Support structure 26 is connected to surface 28 of substrate 24 via support elements 30, 32, and 34 (visible in FIG. 1). A movable element, typically referred to as a proof mass 36, is suspended above surface 28 of substrate 24 and is connected to support structure 26 via a flexible support element 38. This suspension is represented by a gap 40 between proof mass 36 and surface 28 visible in FIGS. 2 and 3. Similarly, electrodes 42 and 44, respectively, are suspended above substrate 24 and are also connected to support structure 26. The suspension of electrodes 42 and 44, respectively, is represented by a gap 46 between electrodes 42 and 44 and surface 28 also visible in FIGS. 2 and 3.

Proof mass 36 is adapted for motion relative to an axis 48 located between opposing ends 50 and 52 of proof mass 36. A section 54 of proof mass 36 is formed between axis 48 and end 50 of proof mass 36. Likewise, a section 56 of proof mass 36 is formed between axis 48 and end 52 of proof mass 36. In the embodiment of FIGS. 1-3, electrodes 42 and 44 are disposed between proof mass 36 and surface 28 of substrate 24. More particularly, electrode 42 is disposed beneath and spaced apart from section 54 of proof mass 36. Likewise, electrode 44 is disposed beneath and spaced apart from section 56 of proof mass 36.

Flexible support element 38 represents one or more torsion springs coupling proof mass 36 to support structure 26. In an embodiment, flexible support element 38 enables the rotation of proof mass 36 about axis 48 in response to z-axis acceleration (i.e., acceleration perpendicular to surface 28 of substrate 24). However, electrodes 42 and 44 are fixedly attached with support structure 26. Thus, when proof mass 36 rotates about axis 48 in response to acceleration, electrodes 42 and 44 connected to support structure 26 remain substantially non-movable relative to proof mass 36. Consequently, proof mass 36 changes its position relative to electrodes 42 and 44 in response to z-axis acceleration. This rotation is particularly illustrated in FIG. 3, and is represented by an arrow 49.

When intended for operation as a "teeter-totter" type sensor, section 54 of proof mass 36 on one side of axis 48 is formed with relatively greater mass than section 56 on the other side of axis 48. The greater mass of section 54 may be created by offsetting axis 48 such that an extended portion 58 of proof mass 36 is formed distal from axis 48. In alternative embodiments, the greater mass of section 54 may be created by other means in which axis 48 is centered by, for example, creating openings extending through section 56 that decrease its mass relative to section 54, forming section 54 to be thicker than section 56 so as to increase its mass relative to section 56, and so forth.

In general, electrode 42 forms a capacitor 60, labeled C1, with section 54 of proof mass 36 and electrode 44 forms a capacitor 62, labeled C2, with section 56 of proof mass 36. An acceleration which causes proof mass 36 to pivot about axis 48 so that section 54 moves closer to electrode 42 and section 56 moves farther from electrode 44 will result in a measured increase of capacitance at capacitor 60 and a measured decrease of capacitance at capacitor 62. Thus, a differential sense scheme is formed. Electrodes 42 and 44 represent a wide variety of electrode structures that can be used for sensing capacitance and/or for providing actuation for feedback "closed-loop" operation and/or for "self test" operation. Electrodes 42 and 44 can be formed in a wide variety of shapes and sizes, and may or may not be arranged symmetrically relative to axis 48 in accordance with design requirements.

In an embodiment, support structure 26 is a frame having a central opening 64 in which proof mass 36 is positioned. The frame configuration of support structure 26 includes a frame section 66 laterally displaced from end 50 of proof mass 36 and a frame section 68 laterally displaced from the opposing end 52 of proof mass 36. Support element 30 is coupled to frame section 66 and an anchor 70 connects support element 30 to surface 28 of substrate 24. Likewise, support element 32 is coupled to frame section 68 and an anchor 72 connects support element 32 to surface 28 of substrate 24. In an embodiment, support element 34 is coupled to an intermediate frame section 74 interposed between frame sections 66 and 68 proximate axis 48. Another anchor 76 connects support element 34 to surface 28 of substrate 24. Anchors 70, 72, and 76 are represented by "X" marks imposed over corresponding rectangles to symbolize their fixed connection to the underlying substrate 24.

Support elements 30, 32, and 34 interconnected between support structure 26 and anchors 70, 72, and 76 are spring elements. Thus, support elements 30, 32, and 34 are alternatively referred to herein as spring elements 30, 32, and 34. Support structure 26 is a stress isolating frame structure that is rigid as compared to spring elements 30, 32, and 34 so that support structure 26 can move nearly as a rigid body in response to deformation of the underlying substrate 24. This deformation of substrate 24 can produce rotation of support structure 26 about the x-axis and the y-axis which are perpendicular to one another, but are substantially parallel to surface 28 of substrate 24. Any rotation about the x- and/or y-axes can cause z-axis displacements of support structure 26. However, since proof mass 36 and electrodes 42 and 44 are all mounted to support structure 26, movement of support structure 26 due to deformation of substrate 24 will not affect the capacitive output of MEMS sensor 22.

The design of spring elements 30, 32, and 34 can take many forms. However, in general, MEMS sensor 22 should include at least two spring elements that are located as far apart as possible, for example, on opposing ends of support structure 26. Additionally, MEMS sensor 22 including spring elements 30, 32, and 34 with anchors 70, 72, and 76 should be strong enough to withstand mechanical shock, for example, in excess of 10,000 g. Furthermore, spring elements 30, 32, and 34 should be suitably compliant in axial and rotational directions (i.e., able to stretch and bend) to accommodate deformation of substrate 24.

Support structure 26 includes a number of isolation joints 78 extending through the entire thickness of support structure 26. Isolation joints 78 are formed utilizing an electrically nonconductive material, or dielectric having negligible electrical conductivity such as glass, silicon dioxide, silicon nitride, or any other compatible material. Isolation joints 78 are suitably formed to electrically isolate each of frame sections 66, 68 and intermediate frame section 74 from one another. In such a configuration, spring elements 30, 32, and 34 with their associated anchors 70, 72, and 76 perform an additional function. That is, frame section 66, spring element 30, and anchor 70 define an electrically conductive path 80 for electrode 42. Frame section 68, spring element 32, and anchor 72 define another electrically conductive path 82 for electrode 44. And intermediate frame section 74, spring element 34, and anchor 76 define yet another electrically conductive path 84 for proof mass 36. Electrically conductive paths 80, 82, and 84 are electrically isolated from one another via isolation joints 78, while providing electrical connection for electrode 42, electrode 44, and proof mass 36, respectively.

MEMS sensor 22 having the frame configuration of support structure 26 is provided for illustrative purposes. Alternative embodiments may include various support structure, proof mass, and electrode configurations implemented for a particular design, provided that the proof mass and electrodes are suspended above the surface of the substrate and are suitably coupled to the support structure.

Figure 4:
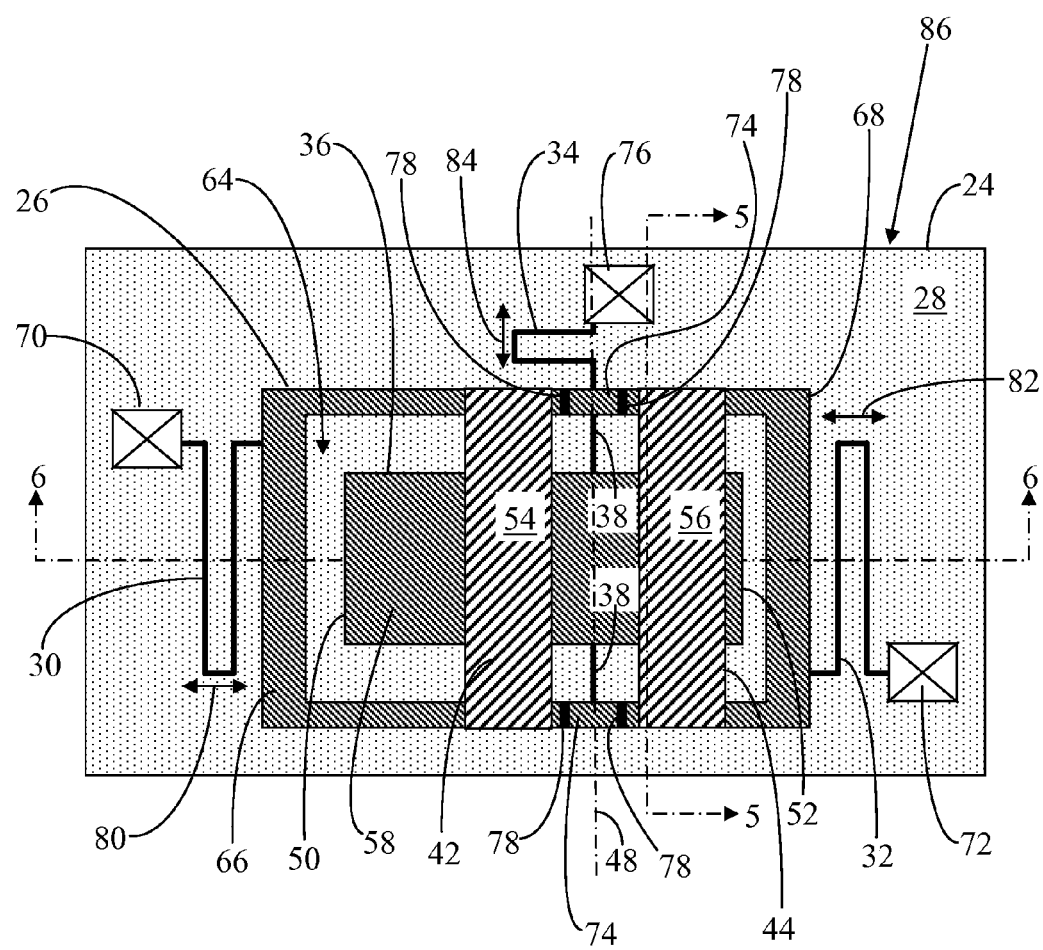
FIG. 4 shows a top view of a MEMS sensor in accordance with another embodiment.
Figure 5:
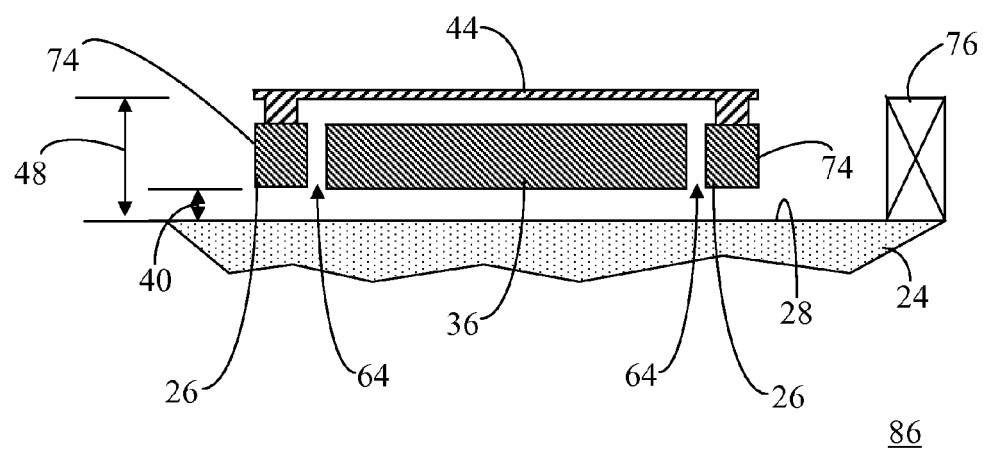
FIG. 5 shows a side view of the MEMS sensor along section line 5-5 in FIG. 4.
Figure 6:
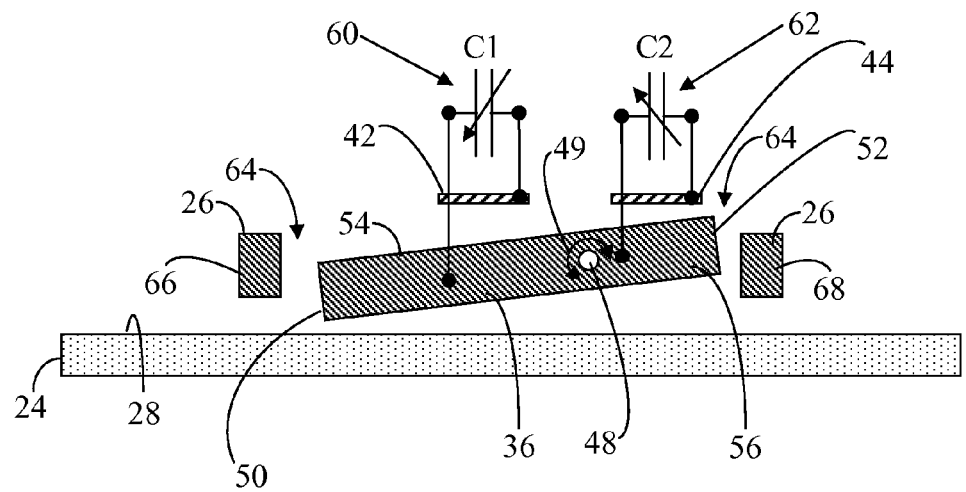
FIG. 6 shows a side view of the MEMS sensor along section line 6-6 in FIG. 4.

Referring now to FIGS. 4-6, FIG. 4 shows a top view of a MEMS sensor 86 in accordance with another embodiment. FIG. 5 shows a side view of MEMS sensor 86 along section line 5-5 in FIG. 4, and FIG. 6 shows a side view of MEMS sensor 86 along section line 6-6 in FIG. 4. The elements of MEMS sensor 86 are generally equivalent to the elements of MEMS sensor 22 (FIG. 1), with the exception being that the sense electrodes are disposed above the proof mass instead of beneath the proof mass. Accordingly, the elements of MEMS sensor 86 will be referenced with the same reference numerals as those used in connection with MEMS sensor 22 for simplicity of explanation.

Like MEMS sensor 22, MEMS sensor 86 includes substrate 24 and support structure 26 suspended above and connected to surface 28 of substrate 24 via spring elements 30, 32, and 34. Proof mass 36, is suspended above surface 28 of substrate 24 and is connected to support structure 26 via a flexible support element 38. Likewise, electrodes 42 and 44, respectively, are suspended above substrate 24 and are also connected to support structure 26. Proof mass 36 includes section 54 formed between axis 48 and end 50 of proof mass 36, and section 56 formed between axis 48 and end 52 of proof mass 36. MEMS sensor 86 further includes the frame configuration of support structure 26, anchors 70, 72 and 76, isolation joints 78, and so forth discussed in detail above.

In the embodiment of FIGS. 4-6, electrodes 42 and 44 are fixedly attached with support structure 26 and are disposed above proof mass 36. More particularly, electrode 42 is disposed above and spaced apart from section 54 of proof mass 36. Likewise, electrode 44 is disposed above and spaced apart from section 56 of proof mass 36. In general, electrode 42 forms capacitor 60 with section 54 of proof mass 36 and electrode 44 forms a capacitor 62 with section 56 of proof mass 36. When acceleration causes proof mass 36 to pivot about axis 48 so that section 56 moves closer to electrode 44 and section 54 moves farther from electrode 42, a measured increase of capacitance can occur at capacitor 62 and a measured decrease of capacitance can occur at capacitor 60.

Figure 7:
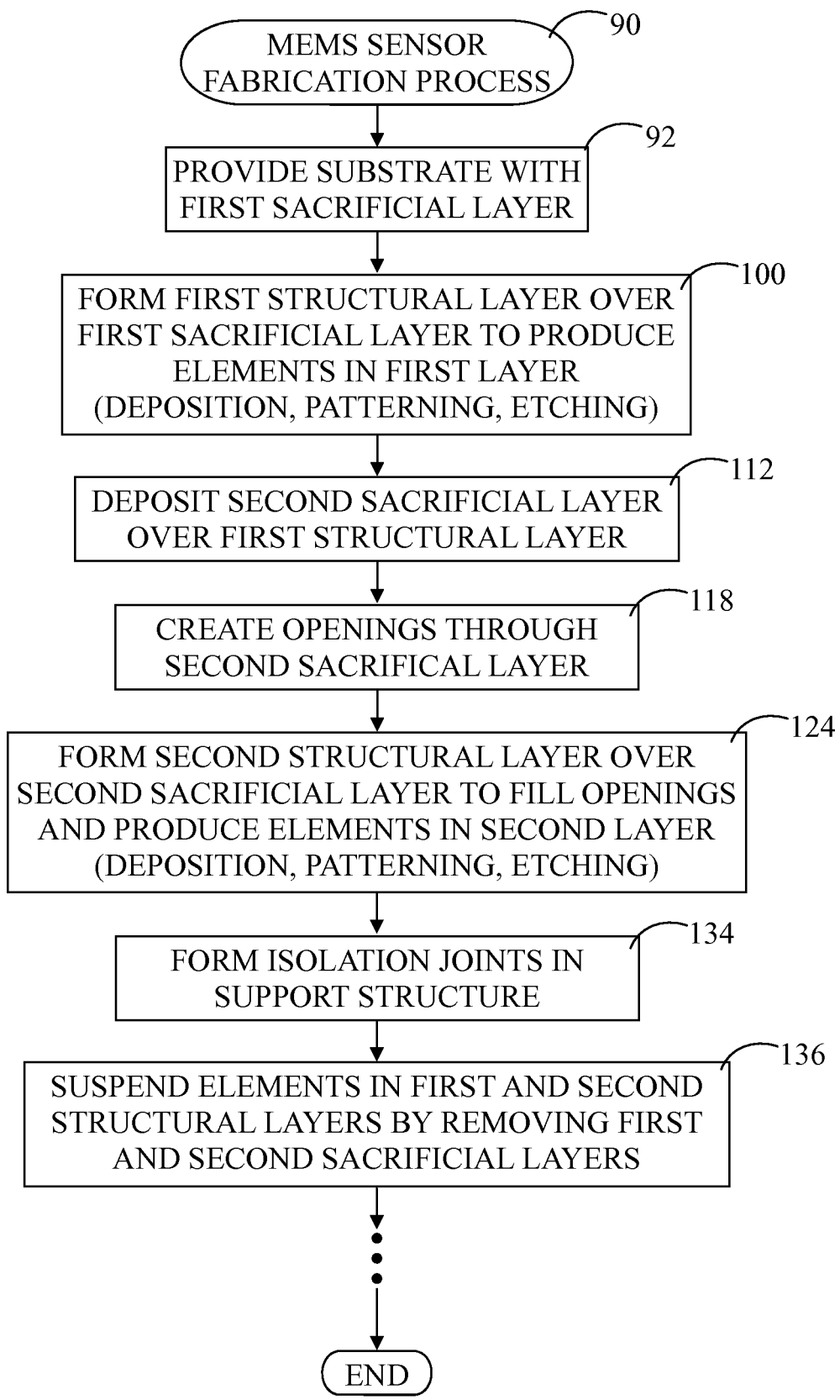
FIG. 7 shows a flowchart of a microelectromechanical systems (MEMS) sensor fabrication process in accordance with another embodiment.

FIG. 7 shows a flowchart of a microelectromechanical systems (MEMS) sensor fabrication process 90 in accordance with another embodiment. MEMS device fabrication process 90 provides methodology for fabricating a MEMS sensor, such as MEMS sensor 22 (FIG. 1) or MEMS sensor 86 (FIG. 4) that is largely isolated from an underlying substrate through the suspension of fixed elements above the substrate. Process 90 will be discussed in connection with the fabrication of MEMS sensor 22. However, it should become apparent that the following methodology can be adapted to fabricate other MEMS sensor designs in which stress isolation for improved offset performance is desired.

Fabrication process 90 is described below in connection with the fabrication of a single MEMS sensor 22 for simplicity of illustration. However, it should be understood by those skilled in the art that the following process allows for concurrent manufacturing of a plurality of MEMS sensors 22. For example, multiple MEMS sensors 22 may undergo concurrent semiconductor thin-film manufacturing on a wafer substrate 24. The individual MEMS sensors 22 can then be cut, or diced, in a conventional manner to provide individual MEMS sensors 22 that can be packaged either by itself or with another die or dies. The packaged MEMS sensors can then be coupled onto a printed circuit board in an end application.

MEMS device fabrication process 90 begins with an activity 92. At activity 92, substrate 24 is provided with a first sacrificial layer deposited thereon.

Figure 8:
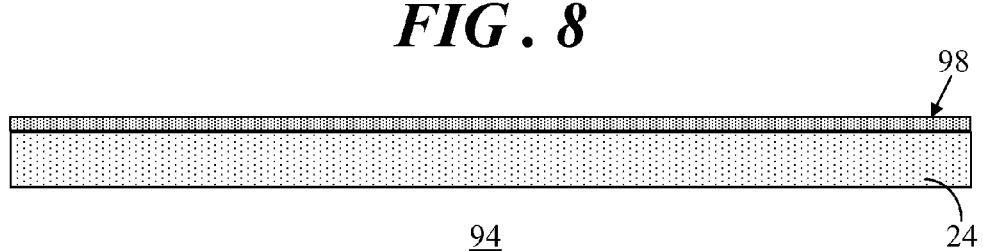
FIG. 8 shows a side view of the MEMS sensor of FIG. 1 at a beginning stage of processing.

Referring to FIG. 8 in connection with activity 92, FIG. 8 shows a side view of MEMS sensor 22 (FIG. 1) at a beginning stage 94 of processing in accordance with activity 92. At beginning stage 94, substrate 24 is provided. In FIG. 8 as well as in subsequent FIGS. 9-15, the side view of MEMS sensor 22 is viewed along section lines 2-2 of FIG. 1.

Substrate 24 may be a silicon wafer with a blanket layer of a sacrificial layer 98, for example, phosphosilicate glass (PSG), which is provided from a wafer provider. Alternatively, substrate 24 may be provided from a provider. Following receipt of substrate 24, sacrificial layer 98 may then be deposited over substrate 24 by the manufacturing facility fabricating MEMS sensor 22. Although silicon wafer and PSG are mentioned, those skilled in the art will recognized that substrate 24 and sacrificial layer 98 may be formed from other types of materials, and/or substrate 24 may also be formed in multiple layers. In an optional embodiment, sacrificial layer 98 may be etched at particular regions at which the eventual fabrication of anchors 70, 72, and 76 (FIG. 1) will occur.

With reference back to MEMS sensor fabrication process 90 (FIG. 7), following activity 92, an activity 100 is performed. At activity 100, a first structural layer is formed over sacrificial layer 98 (FIG. 8) to produce at electrodes 42 and 44 in the first structural layer.

Figure 9:
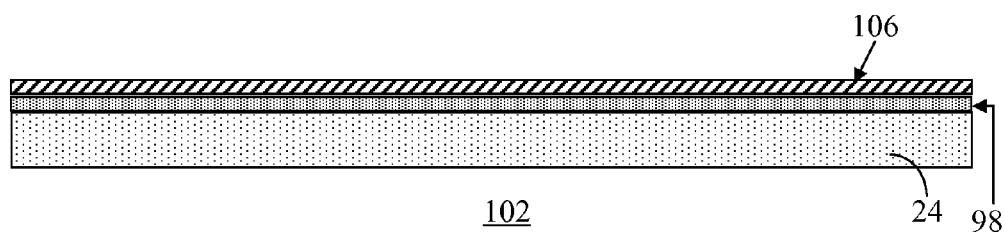
FIG. 9 shows a side view of the sensor of FIG. 8 at a subsequent stage of processing.
Figure 10:
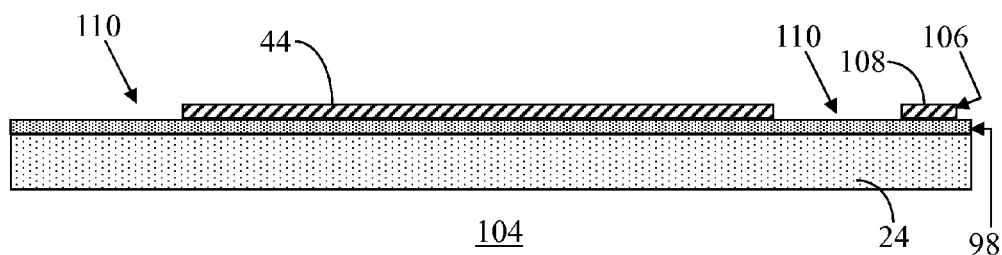
FIG. 10 shows a side view of the sensor of FIG. 9 at a subsequent stage of processing.

Referring to FIGS. 9 and 10 in connection with activity 100, FIG. 9 shows a side view of the device of FIG. 8 at a subsequent stage 102 of processing, and FIG. 10 shows a side view of the device of FIG. 9 at a subsequent stage 104 of processing. At stage 102 shown in FIG. 9, material such as polysilicon, is deposited on sacrificial layer 98 to form a first structural layer 106. First structural layer 106 is represented by upwardly and rightwardly directed wide hatching. At stage 104 shown in FIG. 10, first structural layer 106 is patterned and etched to produce electrode 42 (FIG. 1), electrode 44, and a portion 108 of each of anchors 70, 72, and 76. Patterning and etching process techniques yield trenches 110 that physically separate elements 42 (FIG. 1), 44, and 108 from one another.

With reference back to MEMS sensor fabrication process 90 (FIG. 7), following activity 100, an activity 112 is performed. At activity 112, another sacrificial layer is deposited over first structural layer 106 (FIG. 10).

Figure 11:
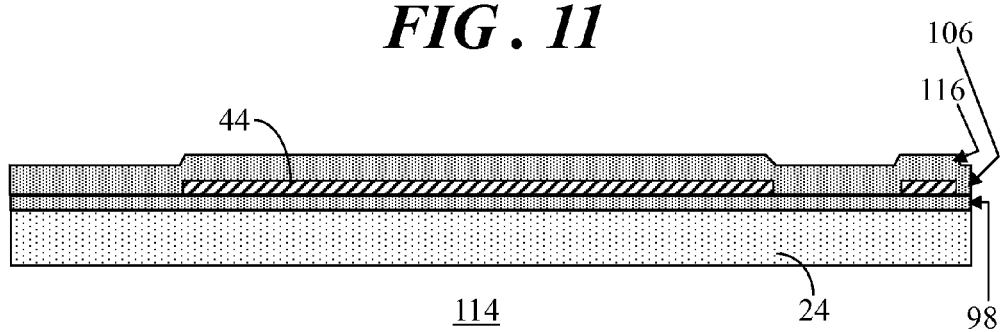
FIG. 11 shows a side view of the sensor of FIG. 10 at a subsequent stage of processing.

Referring to FIG. 11 in connection with activity 112, FIG. 11 shows a side view of the sensor of FIG. 10 at a subsequent stage 114 of processing. At stage 114, another sacrificial layer 116 of, for example, PSG, is deposited over first structural layer 106 as well as exposed regions of first sacrificial layer 98. Sacrificial layer 116 at least partially fills trenches 110 (FIG. 10) etched through first structural layer 106 at activity 100 (FIG. 7).

With reference back to MEMS sensor fabrication process 90 (FIG. 7), following activity 112, an activity 118 is performed. At activity 118, openings are created through the sacrificial layer 116 (FIG. 6).

Figure 12:
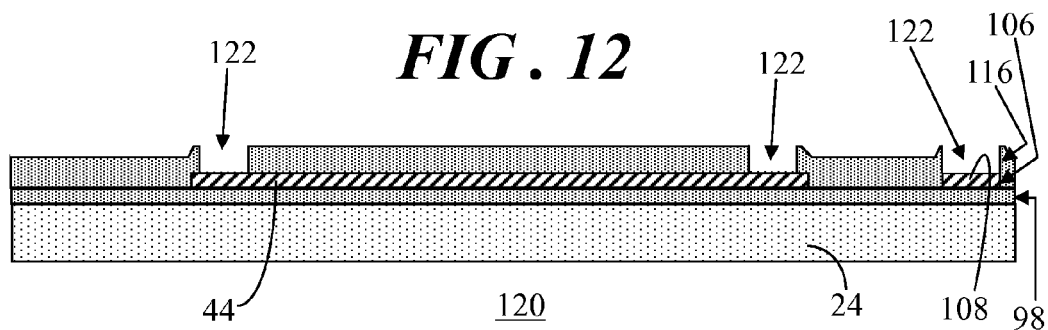
FIG. 12 shows a side view of the sensor of FIG. 11 at a subsequent stage of processing.

Referring to FIG. 12 in connection with activity 112 (FIG. 7), FIG. 12 shows a side view of the sensor of FIG. 11 at a subsequent stage 120 of processing. At stage 120, openings 122 are created through sacrificial layer 116 to expose portions of electrode 42 (FIG. 1), electrode 44, and in this example portion 108 of first structural layer 98.

With reference back to MEMS sensor fabrication process 90 (FIG. 7), following activity 118, an activity 124 is performed. At activity 124, a second structural layer is formed over sacrificial layer 116 (FIG. 12) to fill openings 122 (FIG. 12) and to produce support structure 26 (FIG. 1) and proof mass 36 (FIG. 1).

Figure 13:
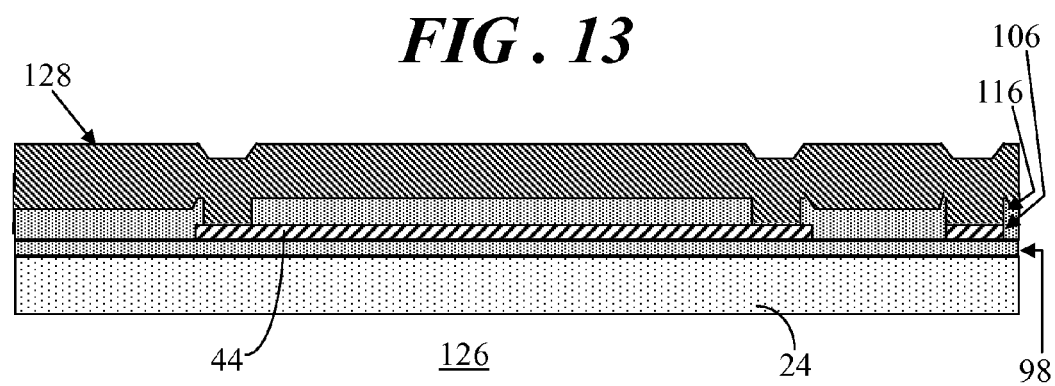
FIG. 13 shows a side view of the sensor of FIG. 12 at a subsequent stage of processing.

Referring to FIG. 13 in connection with activity 124, FIG. 13 shows a side view of the device of FIG. 12 in a subsequent stage 126 of processing. At stage 126, another layer of material such as polysilicon is deposited on sacrificial layer 116 to form a second structural layer 128. Second structural layer 128 is represented by downwardly and rightwardly directed narrow hatching. The deposition of second structural layer 128 over sacrificial layer 116 fills openings 122 (FIG. 12) in sacrificial layer 116.

Figure 14:
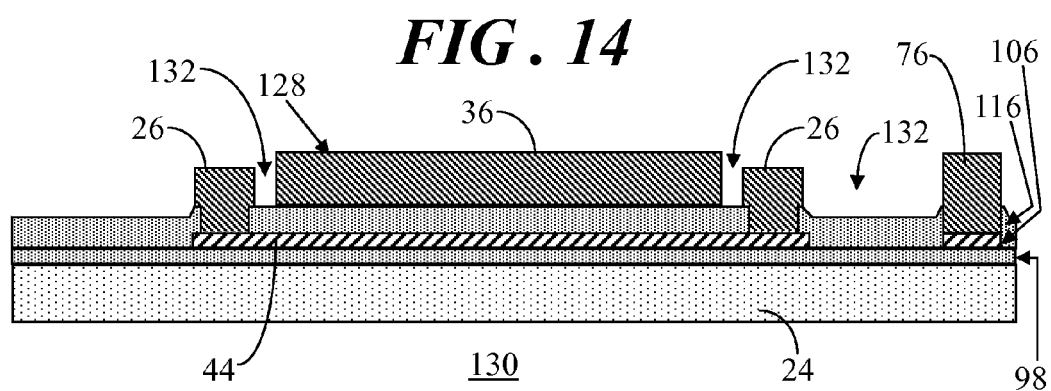
FIG. 14 shows a side view of the sensor of FIG. 13 at a subsequent stage of processing.

Referring to FIG. 14 in connection with activity 124 (FIG. 7), FIG. 14 shows a side view of the device of FIG. 13 in a subsequent stage 130 of processing. At stage 130, second structural layer 128 is patterned and etched to produce support structure 26, proof mass 36, spring elements 30, 32, and 34 (FIG. 1), anchors 70 and 72 (FIG. 1), and anchor 76. Patterning and etching process techniques of activity 124 (FIG. 8) yield trenches or spaces 132 that physically separate elements support structure 26, proof mass 36, and anchors 70, 72, and 76 from one another, with only the attachment of spring elements 30, 32, and 34 remaining between support structure 26 and anchors 70, 72, and 76. Although not visible in the view of FIG. 14, trenches 132 are also formed through support structure 26 at suitable locations for isolation trenches 78 (FIG. 1).

With reference back to MEMS sensor fabrication process 90 (FIG. 7), following activity 124, an activity 134 is performed. At activity 134, isolation joints 78 are formed in support structure 26. More particularly, an electrically insulating material such as glass, silicon dioxide, silicon nitride, or any other compatible material, is deposited in trenches 132 (not shown) extending through support structure 26.

MEMS sensor fabrication process 90 continues with an activity 136. At activity 136, the elements in first and second structural layers 106 and 128 are suspended over substrate 24 by removing first and second sacrificial layers 98 and 116 employing, for example, an etching technique.

Figure 15:
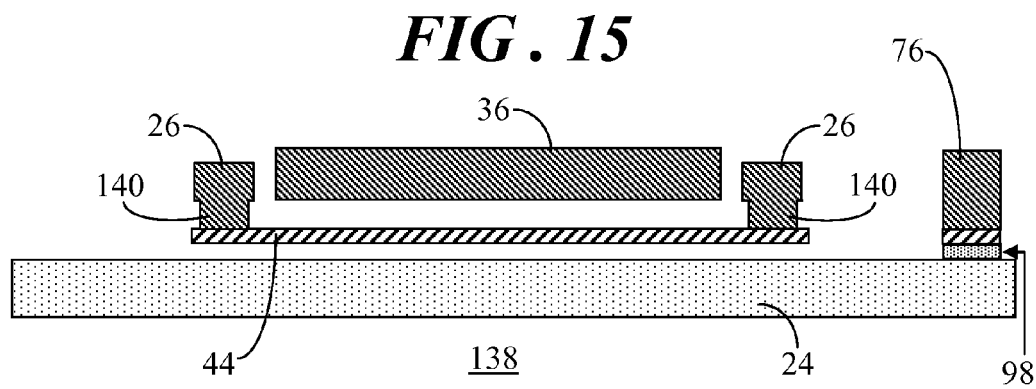
FIG. 15 shows a side view of the sensor of FIG. 14 at a subsequent stage of processing.

Referring to FIG. 15 in connection with activity 136, FIG. 15 shows a side view of the device of FIG. 14 at a subsequent stage 138 of processing. At stage 138, at least portions of sacrificial layers 98 and 116 are etched using known processes to suspend support structure 26, proof mass 36, electrodes 42 (FIG. 1) and 44 above surface 28 of substrate 24. In addition, sacrificial layers 98 and 116 are removed to release spring elements 30, 32, and 34 (FIG. 1), from the underlying substrate 24. FIG. 15 generally represents the side view of MEMS sensor 22 along section line 2-2 of FIG. 1, as also shown in FIG. 2.

Note in the exemplary illustration of FIG. 15 that junctions 140 are formed between support structure 26 and electrode 44. Of course, junctions 140 are also formed between support structure 26 and electrode 42 (FIG. 1). Junctions 140 were formed at task 124 (FIG. 7) when openings 122 (FIG. 12) were filled during the formation of second structural layer 128. Junctions 140 provide at least one connection between support structure 26 and the underlying electrodes 42 and 44 so that electrodes 42 and 44 are suspended above substrate 24.

In an embodiment, the etching of sacrificial layers 98 and 116 at activity 136 removes substantially an entirety of sacrificial layer 116 (FIG. 11) so that support structure 26 and proof mass 36 of second structural layer 128 are spaced apart from first structural layer 106, containing electrodes 42 and 44, with the exception of junctions 140. The etching of sacrificial layers 98 and 116 at activity 136 further results in removal of substantially an entirety of sacrificial layer 98 underlying electrodes 42 and 44 and spring elements 30, 32, and 34 so that they are suspended above and spaced apart from substrate 24. However, in an embodiment, sacrificial layer 98 remains in the anchor regions so that support structure 26 is attached to substrate 24 via spring elements 30, 32, and 34 and anchors 70, 72, and 76.

The selective removal of sacrificial layers 98 and 116 can be achieved by making certain regions of support structure 26, proof mass 36, and electrodes 42 and 44 porous to an etch material, or etchant. This porosity may be accomplished by fabricating first and second structural layers 106 and 128 with through-holes (not shown for simplicity of illustration). The through-holes can provide passage through which an etchant can pass to reach the underlying sacrificial layers 98 and 116. Of course, through-holes need not be fabricated through at least first structural layer 106 at the locations at which anchors 70, 72, and 76 are to be formed so that sacrificial layer 98 at those locations will remain following a suitably timed etching process. This porosity may alternatively be accomplished by the properties of the material used to fabricate first and second structural layers 106 and 128. For example, the properties of the material used to fabricate first and second structural layers 106 and 128 may be such that the etchant can permeate through the material of first and second structural layers 106 and 128 to reach the underlying sacrificial layers 98 and 116 without damage to first and second structural layers 106 and 128.

With reference back to MEMS device fabrication process 90 (FIG. 7), following task 136, MEMS device fabrication process 90 may include other activities that are not discussed herein for brevity. These additional fabrication activities, represented by ellipses, may include hermetically sealing MEMS sensor 22, forming electrical interconnects, wafer dicing, packaging, and so forth. Following fabrication of MEMS sensor 22, fabrication process 90 ends with electrodes 42 and 44 connected to support structure 26 and suspended above substrate 24, and with proof mass 36 torsionally coupled to support structure 26 and also suspended above substrate 24.

Fabrication process 90 (FIG. 7) is discussed in connection with the fabrication of MEMS sensor 22 (FIG. 1) in which electrodes 42 and 44 are formed in first structural layer 106.

When electrodes 42 and 44 are produced in first structural layer 106, proof mass 36 torsionally coupled to support structure 26 is formed in second structural layer 128. Conversely, when proof mass 36 torsionally coupled to support structure 26 is produced in first structural layer 106 during the fabrication of MEMS sensor 86 (FIG. 4), electrodes 42 and 44 are formed in second structural layer 128.

Embodiments described herein comprise MEMS sensors that are stress isolated from an underlying substrate. The design approach calls for a support structure, e.g., a stress isolating frame, and a proof mass to be formed in a structural layer and electrodes, e.g., sense elements, to be formed in another structural layer. Junctions connect the sense elements to the support structure, and torsional elements connect the proof mass to the support structure. The two structural layers are subsequently released, or detached, from the underlying substrate. The stress isolating frame is rigid as compared to the spring elements so that the frame will move nearly as a rigid body in response to deformation of the underlying substrate. Elements in one structural layer can achieve sense capability within the layer plane and the other structural layer holds the immovable, i.e., fixed, elements so that they are not in direct contact with the substrate. Accordingly, isolation is achieved by suspending both the movable elements and the fixed sense elements above the surface of a substrate. The movable elements and the fixed sense elements are mounted to a support structure, e.g., a stress isolating frame, which is mounted to substrate anchors via spring elements. Thus, such a MEMS sensor is less susceptible to thermally induced package stress gradients, and can be readily implemented as a low cost, compact, single die transducer utilizing conventional manufacturing processes.

Although the preferred embodiments of the invention have been illustrated and described in detail, it will be readily apparent to those skilled in the art that various modifications may be made therein without departing from the spirit of the invention or from the scope of the appended claims. For example, the support structure, the proof mass, immovable electrodes, the spring elements, and so forth can take on various other shapes and sizes then those that are shown.

What is claimed is:

1. A microelectromechanical systems (MEMS) sensor comprising:
   a substrate;
   a support structure suspended above a surface of said substrate and connected to said substrate via a support element;
   a proof mass suspended above said substrate and flexibly connected to said support structure via a flexible support element, said proof mass being adapted for rotational motion about an axis between first and second ends of said proof mass; and
   an electrode suspended above said substrate and connected to said support structure, said electrode being spaced apart from said proof mass, wherein said electrode is disposed out of a plane in which said proof mass is located.

2. A MEMS sensor as claimed in claim 1 wherein said support structure comprises a frame having a central opening, and said proof mass is positioned in said central opening.

3. A MEMS sensor as claimed in claim 2 wherein:
   said frame includes a first frame section laterally displaced from said first end of said proof mass and a second frame section laterally displaced from said second end of said proof mass;
   said support element includes a first spring element coupled to said first frame section and a second spring element coupled to said second frame section, said frame being a substantially rigid structure as compared to said first and second spring elements; and
   said MEMS sensor further comprises a first anchor connecting said first spring element to said substrate and a second anchor connecting said second spring element to said substrate.

4. A MEMS sensor as claimed in claim 3 wherein:
   said support elements further include a third spring element coupled to an intermediate frame section of said frame, said intermediate frame section being located proximate said axis; and
   said MEMS sensor further includes a third anchor connecting said third spring element to said substrate; and
   said frame includes isolation joints electrically isolating said first, second, and intermediate frame sections from one another so that said first frame section, said first spring element, and said first anchor define a first electrically conductive path for said first electrode, said second frame section, said second spring element, and said second anchor define a second electrically conductive path for said second electrode, and said intermediate frame section, said third spring element, and said third anchor define a third electrically conductive path for said proof mass, each of said first, second, and third conductive paths being electrically isolated from one another.

5. A MEMS sensor as claimed in claim 1 wherein:
   said electrode is a first electrode;
   said proof mass includes a first section formed between said axis and said first end and a second section formed between said axis and said second end, said first electrode being spaced apart from said first section of said proof mass; and
   said MEMS sensor further comprises a second electrode suspended above said substrate and connected to said support structure, said second electrode being spaced apart from said second section of said proof mass, wherein said second electrode is disposed out of said plane in which said proof mass is located.

6. A MEMS sensor as claimed in claim 5 wherein said support structure comprises at least one isolation joint, said at least one isolation joint electrically isolating said first electrode from said second electrode.

7. A MEMS sensor as claimed in claim 1 wherein said support structure comprises at least one isolation joint, said at least one isolation joint electrically isolating said electrode from said proof mass.

8. A MEMS sensor as claimed in claim 1 wherein said electrode is disposed beneath said proof mass.

9. A MEMS sensor as claimed in claim 1 wherein said electrode is disposed above said proof mass.

10. A MEMS sensor as claimed in claim 1 wherein said electrode is fixedly attached to said support structure.

11. A MEMS sensor as claimed in claim 1 wherein said flexible support element comprises a torsion spring for enabling said proof mass to rotate about said axis while said electrode connected to said support structure remains substantially nonmovable relative to said proof mass.

12. A MEMS sensor as claimed in claim 1 wherein said support element includes spring elements, and said support structure is a relatively rigid structure as compared to said spring elements.

13. A device comprising:
    a microelectromechanical systems (MEMS) sensor, said MEMS sensor including:
    a substrate;

a support structure suspended above a surface of said substrate and connected to said substrate via a spring system;

a proof mass suspended above said substrate and flexibly connected to said support structure via a flexible support element, said proof mass being adapted for rotational motion about an axis located between first and second ends of said proof mass, a first section being formed between said axis and said first end and a second section being formed between said axis and said second end;

a first electrode suspended above said substrate and fixedly attached to said support structure, said first electrode being spaced apart from said first section of said proof mass; and a second electrode suspended above said substrate and fixedly attached to said support structure, said second electrode being spaced apart from said second section of said proof mass, wherein each of said first and second electrodes is disposed out of a plane in which said proof mass is located.

14. A device as claimed in claim 13 wherein:

said support structure comprises a frame having a central opening, said proof mass being positioned in said central opening, said frame including a first frame section laterally displaced from said first end of said proof mass and a second frame section laterally displaced from said second end of said proof mass;

said spring system includes a first spring element coupled to said first frame section and a second spring element coupled to said second frame section; and said MEMS sensor further comprises a first anchor connecting said first spring element to said substrate and a second anchor connecting said second spring element to said substrate.

15. A device as claimed in claim 14 wherein:

said spring system further includes a third spring element coupled to an intermediate frame section of said frame, said intermediate frame section being located proximate said axis;

said MEMS sensor further includes a third anchor connecting said third spring element to said substrate; and said frame includes isolation joints electrically isolating said first, second, and intermediate frame sections from one another wherein:

said first frame section, said first spring element, and said first anchor define a first electrically conductive path for said first electrode;

said second frame section, said second spring element, and said second anchor define a second electrically conductive path for said second electrode; and said intermediate frame section, said third spring element, and said third anchor define a third electrically conductive path for said proof mass, each of said first, second, and third conductive paths being electrically isolated from one another.

16. A device as claimed in claim 13 wherein said support structure is a relatively rigid structure as compared to spring elements of said spring system.

17. A device as claimed in claim 13 wherein said axis is an axis of rotation, and said flexible support element comprises a torsion spring for enabling said proof mass to pivot about said axis of rotation while said first and second electrodes connected to said support structure remain substantially nonmovable relative to said proof mass.

18. A microelectromechanical systems (MEMS) sensor comprising:

a substrate;

a support structure suspended above a surface of said substrate and connected to said substrate via a spring system, said support structure including a frame having a central opening;

a proof mass suspended above said substrate and position in said central opening, said proof mass being flexibly connected to said support structure via a flexible support element, said proof mass being adapted for rotational motion about an axis between first and second ends of said proof mass; and an electrode suspended above said substrate and fixedly attached to said support structure, said electrode being spaced apart from said proof mass, wherein said electrode is disposed out of a plane in which said proof mass is located, and said electrode connected to said support structure remains substantially nonmovable relative to said proof mass.

19. The MEMS sensor as claimed in claim 18 wherein:

said electrode is a first electrode;

said proof mass includes a first section formed between said axis and said first end and a second section formed between said axis and said second end, said first electrode being spaced apart from said first section of said proof mass;

said MEMS sensor further comprises a second electrode suspended above said substrate and connected to said support structure, said second electrode being spaced apart from said second section of said proof mass, wherein said second electrode is disposed out of said plane in which said proof mass is located; and said support structure comprises at least one isolation joint, said at least one isolation joint electrically isolating each of said proof mass, said first electrode, and said second electrode from one another.

20. A MEMS sensor as claimed in claim 18 wherein:

said frame includes a first frame section laterally displaced from said first end of said proof mass and a second frame section laterally displaced from said second end of said proof mass;

said spring system includes a first spring element coupled to said first frame section and a second spring element coupled to said second frame section, said frame being a substantially rigid structure as compared to said first and second spring elements; and said MEMS sensor further comprises a first anchor connecting said first spring element to said substrate and a second anchor connecting said second spring element to said substrate.

* * * * *